United States Patent
Adams et al.

(10) Patent No.: US 12,076,663 B2
(45) Date of Patent: Sep. 3, 2024

(54) METHODS FOR MODULATING PETROLEUM-BASED HYDROCARBONS USING AMINES

(71) Applicant: Western Research Institute, Inc., Laramie, WY (US)

(72) Inventors: Jeramie Joseph Adams, Laramie, WY (US); Jean-Pascal Planche, Laramie, WY (US)

(73) Assignee: Western Research Institute, Inc., Laramie, WY (US)

( * ) Notice: Subject to any disclaimer, the term of this patent is extended or adjusted under 35 U.S.C. 154(b) by 0 days.

(21) Appl. No.: 17/438,849

(22) PCT Filed: Mar. 12, 2020

(86) PCT No.: PCT/US2020/022467
§ 371 (c)(1),
(2) Date: Sep. 13, 2021

(87) PCT Pub. No.: WO2020/186102
PCT Pub. Date: Sep. 17, 2020

(65) Prior Publication Data
US 2022/0168669 A1 Jun. 2, 2022

(51) Int. Cl.
*B01D 17/00* (2006.01)
*B01D 17/04* (2006.01)
(Continued)

(52) U.S. Cl.
CPC ............ *B01D 17/047* (2013.01); *C10C 3/026* (2013.01); *C10C 3/08* (2013.01)

(58) Field of Classification Search
CPC .......... C10C 3/026; C10C 3/08; B01D 17/047
See application file for complete search history.

(56) References Cited

U.S. PATENT DOCUMENTS

| | | | |
|---|---|---|---|
| 2,690,976 A | 10/1954 | Bartleson et al. | |
| 2011/0034595 A1 | 2/2011 | Chun et al. | |

(Continued)

FOREIGN PATENT DOCUMENTS

| | | |
|---|---|---|
| CA | 3133353 C | 3/2020 |
| WO | 2017114829 A1 | 7/2017 |
| WO | 2020186102 A1 | 9/2020 |

OTHER PUBLICATIONS

Savage, P.E., Gopalan, S., Mizan, T.I., Martino, C.J. and Brock, E.E. (1995), Reactions at supercritical conditions: Applications and fundamentals, AIChE J., 41: 1723-1778, https://doi.org/10.1002/aic.690410712 (Year: 1995).*

(Continued)

*Primary Examiner* — Prem C Singh
*Assistant Examiner* — Brandi M Doyle
(74) *Attorney, Agent, or Firm* — Santangelo Law Offices, P.C.

(57) ABSTRACT

Methods for of processing an oxygen containing feedstock to an amine reacted liquid or solid phase with a different solubility, polarity and/or functionality may, in various embodiments, comprise steps of contacting the amine with an oxygen containing hydrocarbon with temperature to facilitate reactions to reduce the oxygen content and modulate the solubility, polarity and/or functionality of the products.

17 Claims, 6 Drawing Sheets

(51) Int. Cl.
*C10C 3/02* (2006.01)
*C10C 3/08* (2006.01)

(56) References Cited

U.S. PATENT DOCUMENTS

2015/0197648 A1* 7/2015 Watanabe .............. C09D 11/36
524/505
2018/0010305 A1 1/2018 Bentaj et al.

OTHER PUBLICATIONS

International Patent Application No. PCT/US20/22467 filed Mar. 12, 2020. International Search Report dated Jul. 15, 2020. 4 pages.
International Patent Application No. PCT/US20/22467 filed Mar. 12, 2020. Written Opinion of the International Searching Authority dated Jul. 15, 2020. 5 pages.
International Patent Application No. PCT/US20/22467 filed Mar. 12, 2020. First Named Inventor: Adams.
U.S. Appl. No. 62/817,754, filed Mar. 13, 2019. First Named Inventor: Adams.
Counterpart Canadian Patent Application No. 3,133,353, filed Mar. 12, 2020. Commisioner's Notice—Application Found Allowable dated May 10, 2022. 1 page.
Counterpart Canadian Patent Application No. 3,133,353, filed Mar. 12, 2020. Requisition by Examiner dated Feb. 17, 2022. 3 pages.
Counterpart Canadian Patent Application No. 3,133,353, filed Mar. 12, 2020. Requisition by Examiner dated Oct. 20, 2021. 5 pages.

* cited by examiner

Monomers

O = Carboxylic    N = Primary monoamine
    Phenolic             Secondary monoamine
    Ketone
    Alcohol
    Ester N = Primary diamine
     Secondary diamine

Dimer

N = Primary diamine
     Secondary diamine

Oligomer/Polymer

N = Primary diamine
     Secondary diamine

METHODS FOR MODULATING PETROLEUM-BASED HYDROCARBONS USING AMINES

This application is the United States National Phase of international, PCT application number PCT/US20/22467, filed Mar. 12, 2020, which claims priority to, and benefit of, U.S. Provisional Patent Application No. 62/817,754, filed Mar. 13, 2019, each said application hereby incorporated by reference herein in its entirety.

BACKGROUND

Oxygen rich hydrocarbon feedstocks are naturally occurring and plentiful—as this is the major component of life on earth which has accumulated in the Earth's crust for millions of years. This material is the most widely consumed material for chemical and energy production, in the form of fossil fuels, which are simply prehistoric biomass that has underwent natural processing over geological timescales. This geological processing often leads to a reduction in the amount of oxygen in the prehistoric biomass. In essence, the earth is a geological reactor which reduces biomass to more pure hydrocarbon forms, and the higher the conversion the higher their value: e.g. light sweet oils vs. heavy oils, or high rank anthracite coal vs subbituminous coal. Biomass, lower rank prehistoric biomass (high oxygen content), oxidized prehistoric biomass and oxidized carbon from man-made materials contain oxygen which can create a wide range of undesirable traits such as excessive viscosity, increased boiling point, lower BTU value, increased stiffness, embrittlement, hydrogen-bonding, hydrophilic behavior, hydroscopic traits leading to swelling, hydroscopic effects leading to debonding from surfaces, changes in interfacial tension, surfactant behavior, etc. Since hydrocarbons with oxygen are ubiquitous, new ways should be developed to utilize this valuable feedstock in non-destructive ways to provide new, or enhanced, materials or chemical feedstocks. Presented here are some new and unexpected methods which seek to tune and modulate the properties of oxygen rich hydrocarbons.

Amines are common in biological systems and are commercially produced at large scales for use in several industries. They can be products themselves, but they are generally more useful as intermediate feedstocks to perform a wide range of chemistry to make new products. For instance the diamine, hexamethylenediamine, is used to produce many synthetic polymers, based on aliphatic or semi-aromatic polyamides, such as Nylon (FIG. 1). The most pervasive reaction with amines is attack of oxygen functional groups—usually in the form of ketones or carboxylic acids—to undergo condensation reactions which liberate water. This reaction forms new covalent bonds between the nitrogen of the amine and to a carbon atom connected to an oxygen atom of hydrocarbon molecules. These reactions can also occur with alcohols, aldehydes, ketones, phenols, anhydrides and esters. Amines can be used to provide tailored properties for a wide range of materials by introducing additional specified and controlled functionality, hydrogen-bonding, solubility or mechanical properties. Due to the wide availability of amines, their simple and rich chemistry, and the fact that they can be easily made from renewable sources, they are attractive and useful for developing new chemicals and materials.

By taking advantage of the amine-oxygen chemistry, sources such as (and with no limitations) biomass, lignin, tannic acid, terpenoids, cellulose, sugars, carbohydrates, proteins, fatty acids, naphthenic acids, chars, partially combusted materials, recycled waste, food wastes, coal, petroleum, asphaltenes, graphene oxide, oxidized asphalts, natural surfactants, oxidized plastics, hydroxylated or carboxylated polymers, functionalized polymers including polyethylene terephthalate, polyurethane resin, polyacetates and acrylates of ethylene, oxidized composites and oxidized asphaltenes can be reacted with amines to increase extraction of organic components, change their solubility, mechanical properties and add functionality to derive more useful chemical and material feedstocks.

DESCRIPTION OF THE EMBODIMENTS

Figure 1:
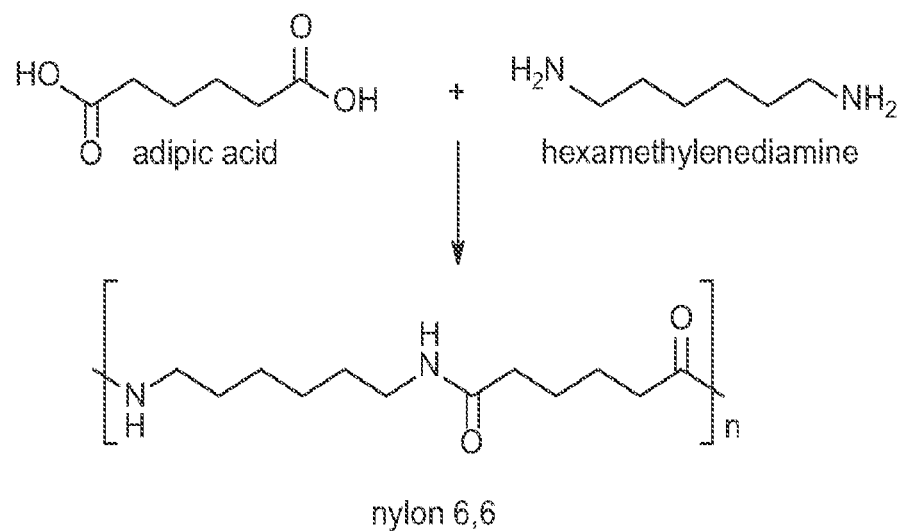
FIG. 1 depicts amine condensation reaction to for nylon 6,6.
Figure 2:
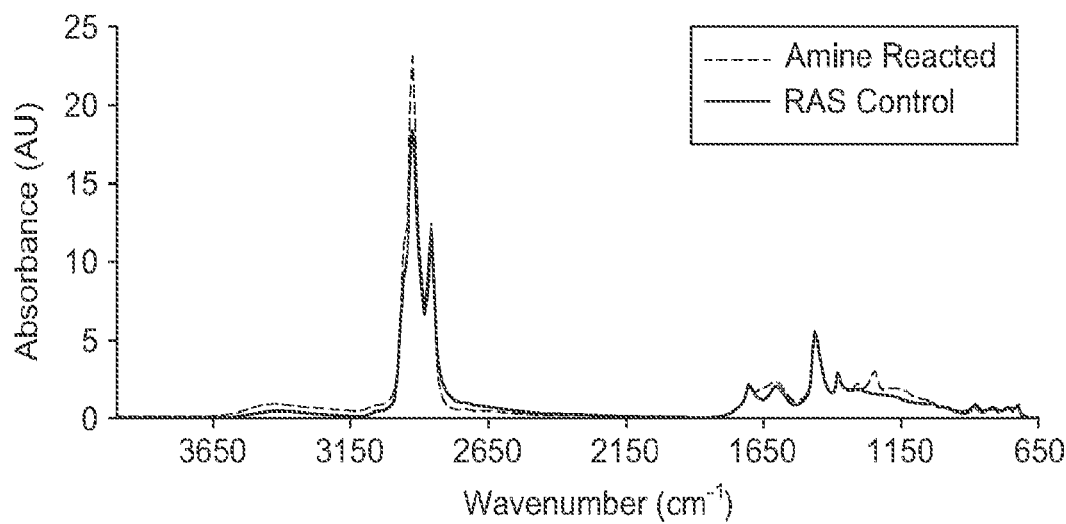
FIG. 2 depicts FTIR spectra for 20 year aged RAS and the same material after reaction with decylamine (top) and asphaltenes from 60 hr pressure aging vessel (PAV) aged maltenes and the same material after reaction with decylamine.
Figure 2:
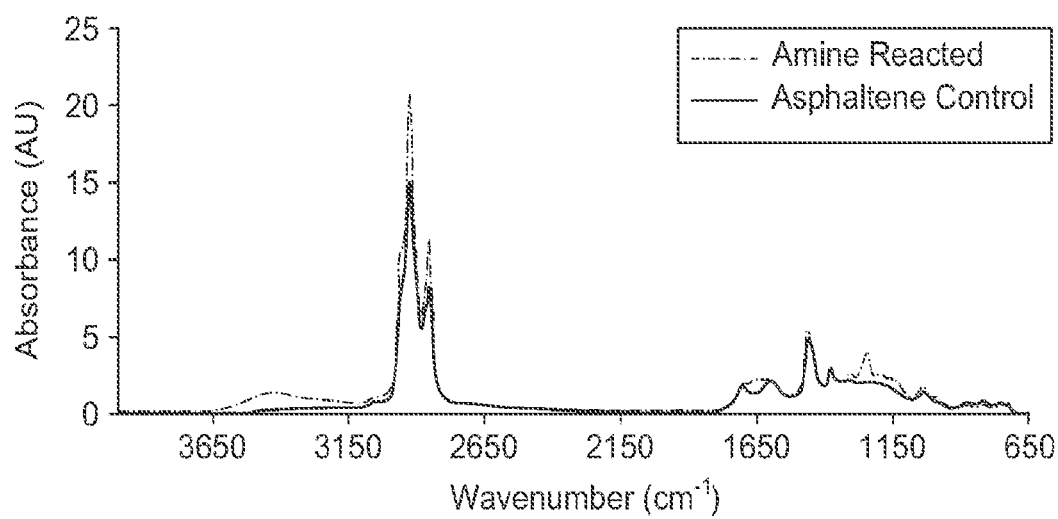

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all the type of amine, the amount of this extracted material that is soluble in heptane can be tuned. FIG. 2 shows the FTIR spectra of highly lab oxidized asphaltenes and 20 year in service aged RAS reacted with a primary amine and Table 1 shows Saturates, Aromatics, Resins-Asphaltene Determinator (SAR-AD) data for the same products. FTIR data shows that the (non-amide) amines are reacting to form amides and other species while the aliphatic nature of the materials also increase due to incorporation of aliphatic chains from the amine. SAR-AD data shows how the amount of less soluble asphaltenes are decreased to form more soluble resins.

TABLE 1

SAR-AD data from the materials shown in FIG. 2.

| Sample ID | Detector | Maltenes | | | | | Asphaltenes | | | | Coking Index $CyC_6/$ $CH_2Cl_2$ | Aging Index | Colloidal Instability Index |
|---|---|---|---|---|---|---|---|---|---|---|---|---|---|
| | | Sat | Aro 1 | Aro 2 | Aro 3 | Resins | $CyC_6$ | Toluene | $CH_2Cl_2$ | Total | | | |
| Asphaltenes from 60 hr PAV Maltenes | ELS 500 nm | 0.00 | 0.00 | 0.00 0.00 | 3.77 8.12 | 13.10 8.31 | 24.58 25.99 | 57.56 56.91 | 0.99 0.68 | 83.13 | 38.21 | 3.47 | 4.93 |
| Amine Reacted from Above | ELS 500 nm | 0.00 | 0.00 | 0.00 0.00 | 8.25 14.91 | 36.35 26.17 | 17.84 21.42 | 36.13 36.87 | 1.43 0.64 | 55.40 | 33.70 | 0.90 | 1.24 |
| RAS after 20 year field aging | ELS 500 nm | 17.08 | 4.60 | 8.43 0.04 | 15.58 3.75 | 15.03 9.46 | 8.46 14.75 | 30.71 71.66 | 0.12 0.33 | 39.29 | 44.56 | 5.41 | 1.29 |
| Amine Reacted from Above | ELS 500 nm | 16.82 | 4.33 | 8.20 0.08 | 17.65 5.57 | 28.44 33.50 | 10.18 23.70 | 14.22 36.85 | 0.16 0.29 | 24.57 | 81.61 | 0.94 | 0.71 | various permutations and combinations of all elements in this or any subsequent application.

Examples of how amine or amide chemistry can be used to tune properties of oxygen containing hydrocarbons:

Asphaltenes from oxidized asphalts, by reaction with amines or amides, can be rendered more soluble, improving relaxation properties and restoring mechanical properties of oxidized asphalt. This reaction also reduces the hydrophilic and hydroscopic nature of asphaltenes produced from oxidation, and other oxygen rich asphaltenes or other oxygen rich material, to render them more hydrophobic, lyophilic or oleophilic. Oxidized asphaltenes from reclaimed asphalt shingles (RAS) or reclaimed asphalt pavements (RAP) can be reacted after isolation, or in-situ the RAS or RAP or in-situ blends of RAS and/or RAP with fresh asphalt, with amines to reduce the content of polar asphaltenes leading to a decrease in the brittleness of this material.

Figure 3:
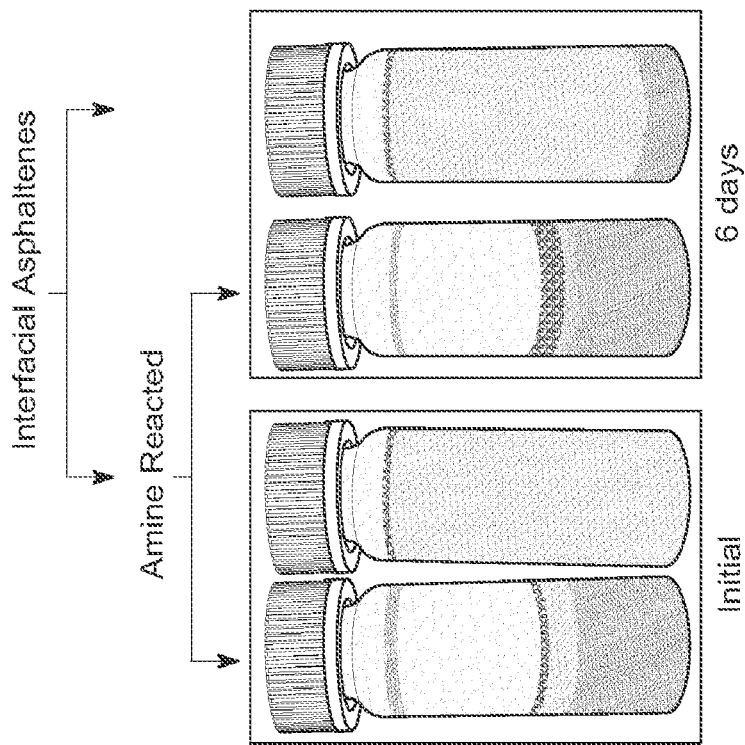
FIG. 3 depicts chlorobenzene and water emulsions initially and after 6 days produced from toluene-insoluble interfacial asphaltenes and the same asphaltenes reacted with an amine. The plots at the right show the viscoelastic modulus of chlorobenzene and water solutions of the interfacial asphaltenes and the interfacial asphaltenes after reaction with the amine.
Figure 3:
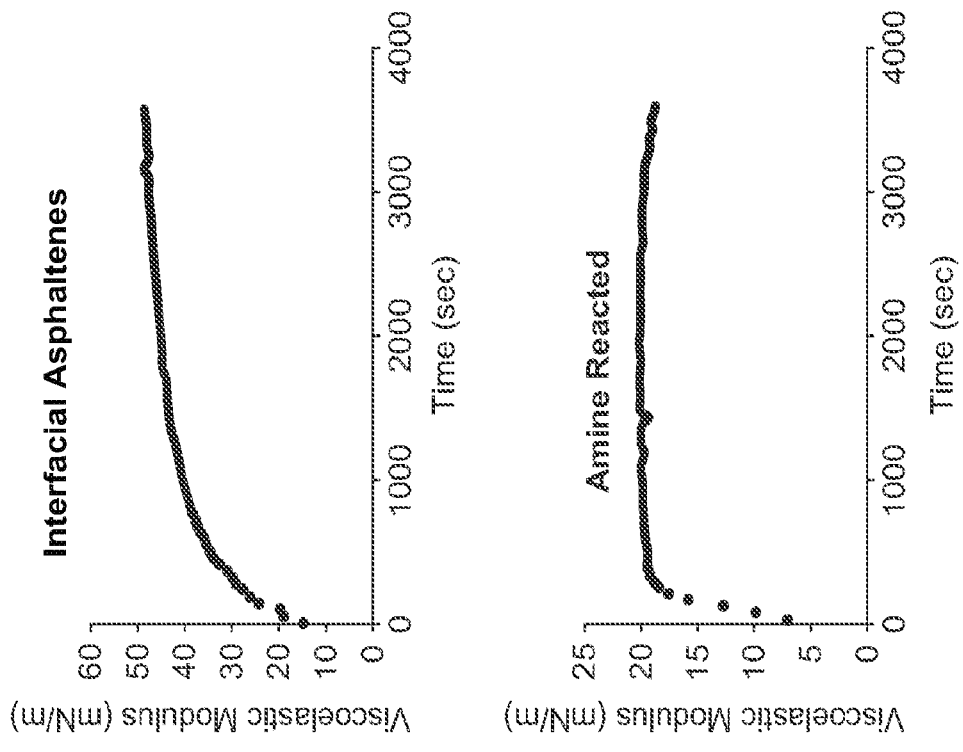
Figure 4:
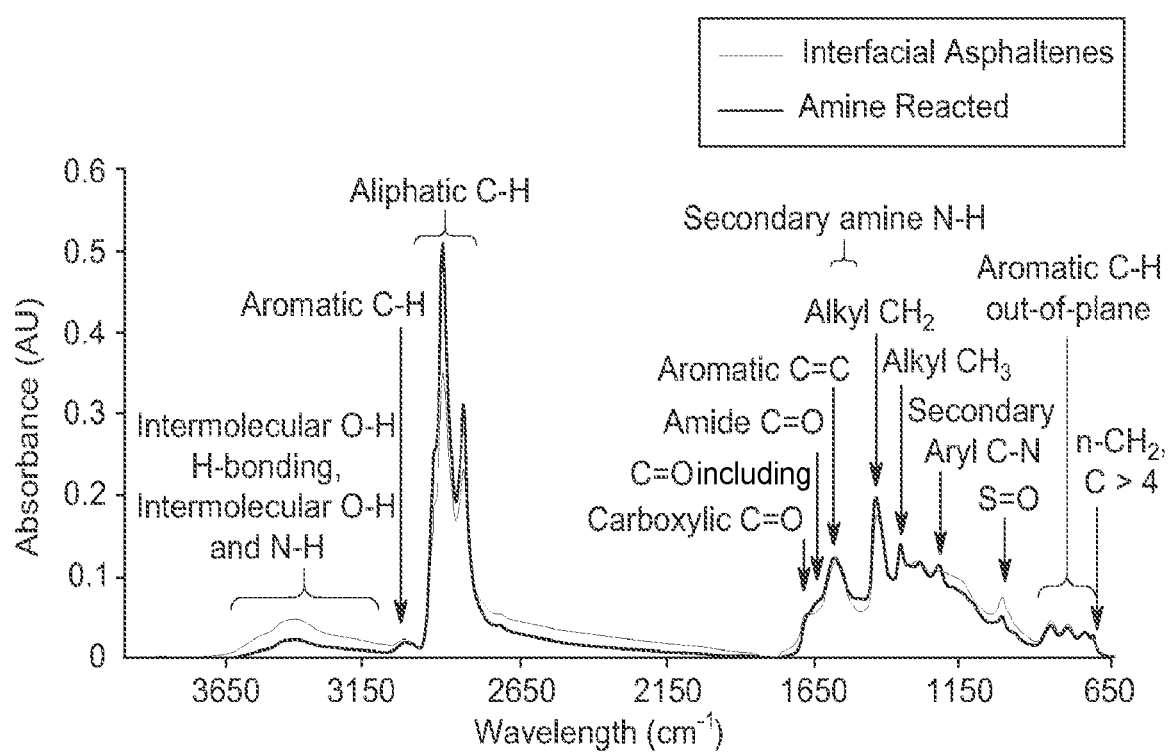
FIG. 4 depicts FTIR spectra of toluene-insoluble interfacially active asphaltenes and the same asphaltenes after a reaction with an amine. Some tentative assignments are provided.

Likewise plastics or polymers with oxygen functions can be reacted with amines to give them new functions and properties, or help them to be recycled in various applications such as asphalt. Additionally it has been shown that highly cross-linked oxygen rich aged biomass can be reacted with amines to convert as much as 82% to 74% into toluene-soluble liquids (where not indicated otherwise, a % refers to wt. %). Depending on the reaction conditions and It has been demonstrated that naturally occurring oxygen rich surfactants from petroleum—that produce strong emulsions—can be rendered interfacially inactive by a reaction with amines. FIG. 3 shows a picture of interfacially active asphaltene emulsion and the emulsion after treating interfacially active asphaltenes with the amine. The figure also shows pendant drop tensiometer measurements for the viscoelasticity of the interfacial films. Table 2 shows how the SAR-AD asphaltene solubility distribution changes for isolated interfacial asphaltenes before and after reaction with amine. With respect to SAR-AD, reference is made to US Department of Transportation, Federal Highway Administration, Tech Brief, Automated High-Performance Liquid Chromatography Saturate, Aromatic, Resin and Asphaltene Separation, FHWA Publication No. FHWA-HRT-15-055; Adams, J. J.; Schabron, J. F.; Boysen, R., Quantitative Vacuum Distillation of Crude Oils to Give Residues Amenable to the Asphaltene Determinator Coupled with Saturates, Aromatics, and Resins Separation Characterization, Energy Fuels 29, 2774-2784, 2015; Boysen, R. B.; Schabron, J. F., The Automated Asphaltene Determinator Coupled with Saturates, Aromatics, Resins Separation for Petroleum Residua Characterization, Energy Fuels 27, 4654-4661, 2013). FIG. 4 shows FTIR spectra of the interfacial asphaltenes before and after reaction with amine.

TABLE 2

SAR-AD data for the samples shown above in FIG. 3.

| Sample ID | Detector | Maltenes | | | | | Asphaltenes | | | | Coking Index $CyC_6$/ $CH_2Cl_2$ | Aging Index | Colloidal Instability Index |
|---|---|---|---|---|---|---|---|---|---|---|---|---|---|
| | | Sat | Aro 1 | Aro 2 | Aro 3 | Resins | $CyC_6$ | Toluene | $CH_2Cl_2$ | Total | | | |
| Interfacial Asphaltenes | ELS | 0.00 | 0.00 | 0.99 | 0.00 | 1.20 | 0.00 | 33.25 | 64.55 | 97.81 | | | 44.57 |
| | 500 nm | | | 0.00 | 0.00 | 0.17 | 0.00 | 31.08 | 68.75 | | 0.00 | 179.40 | |
| Amine Reacted from Above | ELS | 0.00 | 0.00 | 2.25 | 2.65 | 3.35 | 2.95 | 56.82 | 21.97 | 91.75 | | | 11.12 |
| | 500 nm | | | 0.00 | 0.00 | 1.53 | 3.11 | 66.61 | 28.74 | | 0.11 | 43.47 | |

Laboratory Oxidized Asphalt Reacted with Decylamine

The SHRP core asphalt AAA-1 was oxidized by RTFO+ 40 hr PAV according to respectively ASTM D4887 and ASTM D6521 was treated with excess amine (20 volumes) at 120° C. and at 180° C. for 24 hrs with simple stirring at 200 rpm. Note that this time duration is not critical, as times within other ranges are possible (e.g., 5 seconds to 1 minute, 5 seconds to 30 minutes, 5 seconds to one hour, and 5 seconds to 24 hours). After the reaction the excess decylamine was removed by vacuum distillation. It was found that there was higher conversion of the oxidized asphaltenes to more soluble fractions by SAR-AD at 180° C. The SAR-AD data in Table 3 shows how the asphaltenes decreased upon heat treatment, by more than 50% after 180° C. treatment, and that the more soluble and less polar and associating Resins and Aromatics 3 fractions increased in concentration. This leads to a much better stability of the asphalt as shown by the colloidal instability index (CII).

TABLE 3

SAR-AD data for AAA-1 RTFO + 40 hr PAV treated with excess decylamine at 120° C. and at 180° C. for 24 hrs.

| Sample ID | Det | Maltenes | | | | | Asphaltenes | | | | Coking $C_6$/CCl | Aging Index | CII |
|---|---|---|---|---|---|---|---|---|---|---|---|---|---|
| | | Sat | Arom 1 | Arom 2 | Arom 3 | Resins | $CyC_6$ | Toluene | $CH_2Cl_2$ | Total | | | |
| AAA-1 40 hr PAV | ELS | 10.26 | 4.86 | 15.49 | 20.51 | 17.09 | 4.61 | 25.73 | 1.46 | 31.80 | 2.04 | 3.54 | 0.88 |
| | 500 nm | | | 0.08 | 8.54 | 10.04 | 10.31 | 65.97 | 5.06 | | | | |
| AAA-1 40 hr PAV, 120 C. #1 | ELS | 8.68 | 3.98 | 1.81 | 22.80 | 27.73 | 5.01 | 17.69 | 0.30 | 23.00 | 13.00 | 1.27 | 0.55 |
| | 500 nm | | | 0.09 | 11.52 | 26.30 | 12.83 | 48.28 | 0.99 | | | | |
| AAA-1 40 hr PAV, 120 C. #2 | ELS | 8.45 | 3.82 | 13.29 | 22.86 | 28.48 | 4.81 | 18.02 | 0.27 | 23.10 | 13.29 | 1.30 | 0.55 |
| | 500 nm | | | 0.10 | 11.52 | 26.13 | 12.41 | 48.90 | 0.93 | | | | |
| AAA-1 40 hr PAV 180 C. #1 | ELS | 8.13 | 3.59 | 14.02 | 26.43 | 31.74 | 3.59 | 12.24 | 0.25 | 16.09 | 14.09 | 0.76 | 0.39 |
| | 500 nm | | | 0.11 | 12.58 | 37.25 | 11.25 | 38.00 | 0.80 | | | | |
| AAA-1 40 hr PAV 180 C. #2 | ELS | 7.94 | 3.57 | 11.62 | 29.33 | 34.14 | 3.68 | 12.01 | 0.25 | 16.13 | 14.99 | 0.72 | 0.38 |
| | 500 nm | | | 0.10 | 12.73 | 38.23 | 11.57 | 36.61 | 0.77 | | | | |

Figure 5:
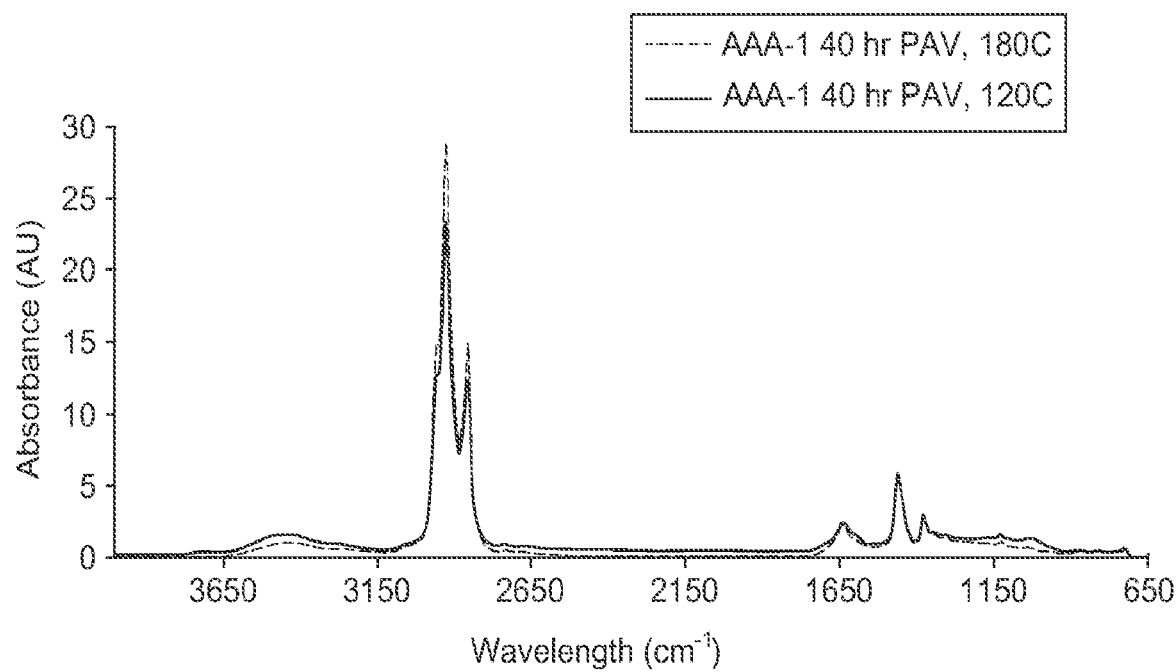
FIG. 5 depicts FTIR spectra for AAA-1 RTFO+40 hr PAV reacted with decylamine at two different temperature.

FTIR spectra in FIG. 5 for the reactions at the two different temperatures shows that the reaction at 180° C. produced material with more aliphatic character and less oxygen C—O character. This is consistent with the SAR-AD data.

AAA-1 RTFO+40 hr PAV was treated with decylamine at different concentrations (0, 2, 4, 8, and 32%) at asphalt blending and storage conditions around 160-180° C. for 30 minutes using simple stirring at 200 rpm. SAR-AD results in Table 4 showed that the amount of asphaltenes decreased steadily with the amount of amine until about 8% amine, the Resins and Aromatics 3 increase, and the CII improves. This shows how amines can be reacted with oxidized asphalt to change the oxidized components into more soluble fractions and softens the asphalt significantly, restoring relaxation. This is an example of how to chemically reverse the effects of oxidative aging.

TABLE 4

SAR-AD data for AAA-1 RTFO + 40 hr PAV treated with various amount of decylamine at 160° C. for 30 minutes.

| Sample ID (% Decylamine) | Det | Maltenes | | | | | Asphaltenes | | | | Coking $C_6$/CCl | Aging Index | CII |
|---|---|---|---|---|---|---|---|---|---|---|---|---|---|
| | | Sat | Arom 1 | Arom 2 | Arom 3 | Resins | $CyC_6$ | Toluene | $CH_2Cl_2$ | Total | | | |
| AAA-1 40 hr PAV 0% | ELS | 14.75 | 6.26 | 20.29 | 24.10 | 11.72 | 5.51 | 17.11 | 0.26 | 22.87 | | | 0.78 |
| | 500 nm | | | 0.12 | 9.08 | 13.05 | 15.96 | 60.62 | 1.16 | | 13.72 | 2.72 | |
| AAA-1 40 hr PAV + 2% | ELS | 14.59 | 6.23 | 19.12 | 23.62 | 15.79 | 4.94 | 15.44 | 0.28 | 20.66 | | | 0.71 |
| | 500 nm | | | 0.13 | 10.86 | 17.42 | 15.40 | 54.94 | 1.27 | | 12.16 | 1.93 | |

TABLE 4-continued

SAR-AD data for AAA-1 RTFO + 40 hr PAV treated with various amount of decylamine at 160° C. for 30 minutes.

| Sample ID | | Maltenes | | | | | Asphaltenes | | | | Coking | Aging | |
|---|---|---|---|---|---|---|---|---|---|---|---|---|---|
| (% Decylamine) | Det | Sat | Arom 1 | Arom 2 | Arom 3 | Resins | $CyC_6$ | Toluene | $CH_2Cl_2$ | Total | $C_6$/CCl | Index | CII |
| AAA-1 40 hr PAV + 4% | ELS | 14.49 | 6.17 | 19.06 | 24.35 | 16.72 | 4.89 | 14.08 | 0.24 | 19.21 | | | 0.66 |
| | 500 nm | | | 0.14 | 11.60 | 20.24 | 15.76 | 51.27 | 1.01 | | 15.64 | 1.60 | |
| AAA-1 40 hr PAV + 8% | ELS | 14.46 | 6.04 | 19.25 | 24.83 | 17.37 | 4.49 | 13.34 | 0.22 | 18.05 | | | 0.63 |
| | 500 nm | | | 0.11 | 12.09 | 22.88 | 15.00 | 48.88 | 1.02 | | 14.65 | 1.39 | |
| AAA-1 40 hr PAV + 32% | ELS | 14.19 | 5.80 | 19.41 | 25.81 | 18.02 | 3.54 | 12.97 | 0.26 | 16.77 | | | 0.58 |
| | 500 nm | | | 0.11 | 12.80 | 25.82 | 12.35 | 47.56 | 1.36 | | 9.10 | 1.23 | |

Additional blending experiments were performed by blending AAA-1 RTFO+40 hr PAV with decylamine at 160° C. for 30 minutes followed by vacuum distillation to ensure that any excess residual decylamine, if any, was removed from the asphalt. For comparison the aged AAA-1 RTFO+40 hrs PAV sample was also treated in the same way. DSR characterization of the material according to ASTM D7552 showed that as the amount of amine increased the asphalt became significantly softer (upper PG) at higher temperature and that the low temperature PG decreased with no detriment to the relaxation properties of the asphalt (Table 5) as measured by the m-value parameter—the higher the m-value, the higher the relaxation capability.

TABLE 5

AAD-1 blended with decylamine at different concentrations under an inert atmosphere at 180° C. for 30 minutes.

| Sample ID, (% Decylamine) | Upper PG | Lower PG | m-value | S | ΔTc = (S-m) |
|---|---|---|---|---|---|
| AAA-1 40 hr PAV | 87.0 | −21.0 | −21.0 | −25.5 | −4.5 |
| AAA-1 40 hr PAV, 0%, Dist | 89.1 | −24.9 | −24.9 | −26.2 | −1.3 |
| AAA-1 40 hr PAV, 2%, Dist | 78.6 | −25.3 | −25.3 | −26.5 | −1.2 |
| AAA-1 40 hr PAV, 4%, Dist | 75.9 | −25.1 | −25.1 | −26.1 | −1.0 |
| AAA-1 40 hr PAV, 8%, Dist | 71.7 | −28.2 | −28.2 | −29.9 | −1.7 |

Upon completion of blending the samples were subjected to vacuum distillation to remove any residual decylamine volatiles, if present.

Asphalt Blended with Precipitated Asphaltenes and Stabilized with Decylamine.

The reaction of amines can also be used to help compatibilize asphaltenes containing oxygen functional groups produced from industrial processes such as partial upgrading, paraffinic froth treatment, naphthenic froth treatment, deasphalting, supercritical deasphalting, emulsion deasphalting, aliphatic solvent precipitation, naphthenic solvent precipitation, centrifugation, ultracentrifugation or by other methods that are used to produce asphaltenes. This is shown by blending in asphaltenes from an emulsion precipitation process with asphalt AAA-1 (further named AAA-1) and then blending the asphaltenes with AAA-1 with 2% decylamine. When decylamine is not used and AAA-1 is blended with 10 wt % asphaltenes the upper PG properties increase significantly, however the low temperature PG also increases very significantly and the ΔTc value is decreases. When decylamine is used the low temperature properties are significantly improved. By adding decylamine with the asphaltenes the lower PG decrease by 6° C. and the ΔTc improved by 2° C., relative to the blend with no decylamine. As ΔTc decreases, usually due to a greater change in the m-value (or rate of relaxation) compared to the S (stiffness) the material becomes more brittle and prone to cracking, especially at low temperatures. The m-value related to the binder relaxation and S being its stiffness modulus are traditionally measured by bending beam rheometry, but they can also be measured by dynamic shear rheometry (ASTM D7552 and TechBrief FHWA-HRT-15-053). The ΔTc is simply the subtraction of the critical (or continuous) S and critical (or continuous) m-value temperatures, as the value goes more negative there is a loss in relaxation relative to the stiffness (ASTM D7643). For paving applications, it is desirable that after laboratory RTFO and PAV (or equivalent USAT aging (TechBrief FHWA-HRT-15-054)) oxidative aging that the asphalt binders maintain a ΔTc above −5° C., values below −5 are considered at risk of cracking. It must be noted that these ΔTc values are not strictly applicable to polymer modified asphalts since the properties form the interacting polymer modifier begin to dominate over the properties of the asphalt. Typically, asphalts are more sensitive towards changes in the m-value, so an improvement in the m-value generally leads to an improvement in the ΔTc.

TABLE 5

Upper and lower PG properties for AAA-1 blended with 10% asphaltenes with and without decylamine.

| % Asph. | % Decylamine | Upper PG | Lower PG | m-value | S | ΔTc = (S − m) |
|---|---|---|---|---|---|---|
| 0 | 0 | 62.6 | −23.6 | −23.6 | −24 | −0.4 |
| 10 | 0 | 73.7 | −12.4 | −12.4 | −17.6 | −5.2 |
| 10 | 2 | 67.2 | −18.9 | −18.9 | −21.5 | −2.6 |

Reacting amines or amides to compatibilize asphaltenes with asphalt, to rejuvenate or restore properties of RAP or RAS, or to compatibilize other oxygen containing material in asphalt for performance enhancement or recycling has the added benefit of introducing antistripping properties. Nitrogen is well known to reduce moisture damage which occurs at the rock aggregate surface and between adsorbed asphalt molecules. Moisture damage is increased when the adsorbed asphalt molecules contain oxygen but mitigated when nitrogen is present. The amine reaction also acts to increase the solubility of materials; this not only improves the ΔTc and m-values as discussed, it also leads to a lowering of the stiffens (S), lower PG and upper PG. These are all desirable traits, to one degree or another, to restore or chemically rejuvenate oxidized asphalt pavements and shingles. Ideally, the upper PG would like to be least affected. This rejuvenation or softening of the material also produces other added benefits such as improved workability, lower application temperature, better compaction and lowered emissions.

Dimeric, Oligomeric and Polymeric Materials.

Figure 6:
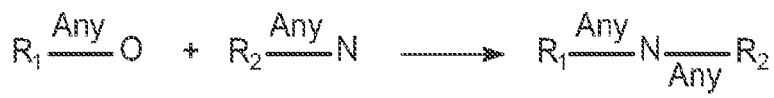
FIG. 6 depicts some generic representations of how amines and oxygen containing molecules can react to form monomers, dimers and trimer. This simplistic representation doesn't account for the fact that very complex 3-dimensional structures can be formed between molecules with multiple oxygen atoms and also molecules with polyamines and the combinations of the two.
Figure 6:
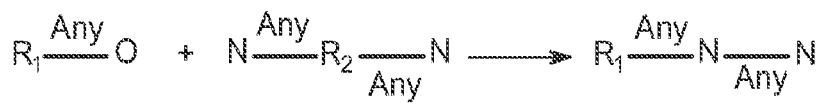
Figure 6:
Figure 6:

Examples from above only deal with the reaction of materials with mono-amines. Many other useful materials can be produced by adding diamines to form dimers, oligomers or polymers. If a large excess of the diamines or polyamines are used then it is possible to create functionalized asphaltenes with pendent amine groups to perform additional chemistry. If the oxygen containing feedstocks on average contains several molecules with two more oxygen atoms of the appropriate functional group, and this is reacted with a diamine, then highly polymerized or cross-linked polymeric materials can be formed. Additional polymerization and cross-linking can be modulated by using polyamines alone or in combination with diamines and monoamines. The degree of polymerization and cross-linking can also be modulated by using molecules with the appropriate di-oxygen or poly-oxygen functional groups in desired geometries and reactivities. Other polymeric materials can be produced with oxygen containing feedstocks and diamines or polyamines by using a combination of comonomers from dialcohols, diketones, dialdehyes, dicarboxylic acids, or dianhydrides or any combination of these, or by sequential reaction. FIG. 6 shows how the amines can be used to make monomers, dimers, and oligomer/polymers. Other polyamines can be used to generate more highly cross-linked polymeric materials.

Similarly, amines containing unsaturated alkyl functional groups can be used to do additional cross-linking through the unsaturated bonds thermally or by addition of other cross-linking agents like sulfur or others. The double bonds may also be used for activation by photosensitizers or by thermal activators to produce cross-linking that are useful for 3-d printing resins. Other options, besides epoxidation, are to perform other chemistry on the unsaturated bond such as formation of epoxides. Additional useful chemistry that can be applied to the unsaturated bond are addition reactions, hydration, halogenation, hydrohalogenation, halohydrin, oxidation, photooxygenation, hydroamination, hydroformylation, carboxylation, carbonalkoxylation, alkylation, ozonolysis, olefin metathesis, hydroacylation.

Reacting amines with oxygen containing hydrocarbons do not preclude decomposition of the amine to form nitriles, do hydrogen donation, or reactions promoting alkyl chain transfer or reaction at other active hydrocarbon sites. Primary amine and alkyl substituents, and secondary amines will also work as well as amines with aryl and cyclic groups.

Amines can also be reacted with feedstock such as oxygen rich biomass, peat, coal, oxidized reclaimed coal, activated carbon, lignin, tannic acid, terpenoids, cellulose, carbohydrates, sugars, carbohydrates, proteins, fatty acids, lipids, nucleic acids, naphthenic acids, municipal waste, food wastes, sewage graphene oxide, hole containing graphene oxide, oxygen containing carbon nanoparticles, oxygen containing carbon nano-tubes, oxygen containing carbon nano-ribons, oxidized plastics, oxygen containing plastics like polyethylene terephthalate, oxidized composite materials, oxygen containing composite material, kerogen, oxidized kerogen, combusted material, partially combusted material, chars, petroleum, asphaltenes, interfacial asphaltenes, oxidized asphalts, oxidized asphaltene, asphaltenes produced from oxidation of hydrocarbon sources, natural surfactants, autoxidation products from petroleum, autoxidation products from natural gas, autoxidation products from biomass, autoxidation products from chemical refining, epoxy, epoxy form wind turbine blades, hydroxylated or carboxylated polymers, functionalized polymers including polyethylene terephthalate, polyurethanes, polyacetates and acrylates of ethylene to extract smaller molecules that are soluble in common solvents provide very soluble fractions as feedstocks for chemicals or materials for the following applications (non exclusive):

Used to make asphalt rejuvenators
asphalt antistrip additives
asphalt warm mix additives
improve compaction
reduce emissions during paving application
asphalt physical properties enhancers such as PG modifiers
improve ΔTc
improve Glover-Rowe
improve cross over temperature
improve phase angle
lower the upper PG
lower the lower PG
lower the m-value
lower the S
increase penetration
decrease ring and ball softening point
improve flow properties
improve lubricity
lubricants
surfactants
method to decrease viscosity
compatibilize indigenous asphaltenes
compatibilize added asphaltenes
surfactants
emulsifiers
water repelling coatings
water resistant coatings
underwater sealants
polymers
polymer cross-linker
synthetic rubber
rubber cross-linking
polymeric coatings
coatings
polyurethane additives
activators for cyanoacrylates coatings
hydrogen-bonding gels
corrosion inhibitors
fuel additives
foulant additives
decarbonizing additives
dye sensitizers for solar cell applications
antimicrobial (ammonium salts) coatings
antistatic and soil-release finishes
iron-ore beneficiation
froth flotation surfactants
asphaltene dispersants
wax inhibitors
drilling and fracking mud
enhance oil recovery additives
additives for plastics and composites
resins for epoxy
resins for 3-D printing
resin for inkjet printing
thermoset resin
thermally activated resin
photo activated resins
method to change softening point
method to change melting properties
method to change solubility
method to change hydrophilicity
method to change hydrophobicity, lyophilicity or oleophilicity
method to modulate hydroscopic properties Other applications for amine reacted or extracted materials include:

Treat oils so that they do not form emulsions

Treat emulsion formed in desalter units

Treat emulsions in reservoirs

Treat emulsions during production of conventional oil wells

Treat emulsions during heavy oil production from SAGD, paraffinic froth treatment, naphthenic froth treatment, other heavy emulsion producing technologies, or other emulsion upgrading technologies Treat oil spill emulsions and sludge for spill remediation and oil recovery of released oil Treat environmentally aged and weathered emulsion and sludge from oil released into the environment High extraction yield of coal to produce low quinoline-insoluble pitches for the areas of carbon fibers, carbon foams, impregnation pitch, mesophase, anodes, coke, graphene, holey graphene, nitrogen containing graphene, graphene oxide, carbon nano-particles, nitrogen containing carbon nano-particles, carbon nano-tubes, nitrogen containing nano-tubes, carbon coatings, nitrogen containing carbon coatings, polymers, nitrogen containing polymers, thermoset resins, epoxy resins, carbon materials and advanced carbon materials High extraction yield of weathered and low rank coal High extraction yield of future, new, old, or prehistoric biomass to produce low quinoline-insoluble pitches for the areas of carbon fibers, carbon foams, mesophase, impregnation pitch, anodes, coke, graphene, holey graphene, nitrogen containing graphene, graphene oxide, carbon nano-particles, nitrogen containing carbon nano-particles, carbon nano-tubes, nitrogen containing nano-tubes, carbon coatings, nitrogen containing carbon coatings, polymers, nitrogen containing polymers, thermoset resins, epoxy resins, carbon materials and advanced carbon materials Perpetual (improved durability) pavement or shingles (or other asphalt related roofing materials) by converting oxidized asphaltenes into more soluble fractions Aid in recycling (rejuvenation) reclaimed asphalt pavement Improve properties in reclaimed asphalt pavement Aid in recycling (rejuvenation) reclaimed asphalt shingles Improve properties in reclaimed asphalt shingles Aid in recycling oxidized plastics for use as other materials for asphalt, coatings and polymers Aid in recycling epoxy, such as epoxy used in wind turbine blade Aid in recycling of epoxy from carbon fiber composites Aid in recycling materials from other composites Amine reactions are also highly efficient at extracting asphaltenes from sorbents by competing for binding to sorbent active sites but also by reacting with oxygen species that are responsible for the strong adsorption of asphaltenes on surfaces (reactive desorption).

While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions. Examples of alternative claims (clauses) may include:

1. A method of processing an oxygen comprising feedstock to an amine/amide reacted liquid phase with a different solubility, polarity and functionality, the method comprising the steps of:

contacting the oxygen comprising feedstock with one or more primary or secondary mono-amine or amide (i.e., one or more primary or secondary mono-amine or primary or secondary mono-amide), under non-pyrolytic conditions; and generating said amine/amide reacted liquid phase as a result of said step of contacting, wherein said amine/amide reacted liquid phase comprises 0.25 to 25 wt % nitrogen, wherein said amine/amide reacted liquid phase has at most 85% of the oxygen in said oxygen comprising feedstock, wherein the solubility of said amine/amide reacted liquid phase is greater than the solubility of said oxygen comprising feedstock and said amine/amide reacted liquid phase is dissolvable in a solvent having a Hansen solubility parameter less than 27 $MPa^{0.5}$ (or less than 25 $MPa^{0.5}$, less than 22 $MPa^{0.5}$, less than 18.2 $MPa^{0.5}$) and wherein said amine/amide reacted liquid phase has a softening point of less than 360° C. (or, more generally, less than 400° C.).

2. A method of processing an oxygen comprising feedstock to an amine/amide reacted liquid phase with a different solubility, polarity and functionality, the method comprising:

contacting the oxygen comprising feedstock with one or more primary or secondary di- or poly-amine or amide under non-pyrolytic conditions and in an amount so that 1 mol of the oxygen of said oxygen comprising feedstock is reacted with more than 2 fold mol of nitrogen of said one or more primary or secondary di- or poly-amine or amide;

generating said amine/amide reacted liquid phase as a result of said step of contacting, wherein said amine/amide reacted liquid phase comprises 0.5 to 50 wt % nitrogen, and wherein amine/amide reacted liquid phase has at most 80% of the oxygen in said oxygen comprising feedstock, wherein an unreacted amine/amide group is linked to said oxygen comprising feedstock, wherein said amine/amide reacted liquid phase is dissolvable in a solvent having a Hansen solubility parameter less than 27 $MPa^{0.5}$ (or less than 25 $MPa^{0.5}$, less than 22 $MPa^{0.5}$, less than 18.2 $MPa^{0.5}$), and wherein said amine/amide reacted liquid phase has a softening point of less than 360° C. (or, more generally, less than 400° C.).

3. A method of processing an oxygen comprising feedstock having less than 5 fold per mol of oxygen to amine/amide reacted solid phase with a different solubility, polarity and functionality, the method comprising:

contacting the oxygen comprising feedstock with one or more primary or secondary di-, or poly-amine or amide under non-pyrolytic conditions and in an amount so that 1 mol of the oxygen of said oxygen comprising feedstock is reacted with less than 10 fold mol of nitrogen of one or more primary or secondary di- or poly-amine or amide, generating a solid phase as a result of said step of contacting, wherein the solid phase comprises 0.5 to 50 wt % nitrogen; and wherein said amine/amide reacted solid phase has at most 80% of the oxygen in said oxygen comprising feedstock, wherein the solubility of said amine/amide reacted solid phase is less than the solubility of said oxygen comprising feedstock, and said solubility of said amine/amide reacted solid phase is such that no more than 50% of said amine/amide reacted solid phase can be dissolved in a solvent with a Hansen solubility parameter less than 20.2 $MPa^{0.5}$ (or less than 18.2 $MPa^{0.5}$)

wherein no more than 50% of said amine/amide reacted solid phase has a softening point greater than 200° C.; and wherein less than 20% of said amines that are put into contact with said oxygen comprising feedstock remain unreacted.

4. The method as described in any preceding clause, wherein at least 10% of oxygen in said oxygen comprising feedstock is in the form of carbonyl, carboxylic, ketone, anhydride, aldehyde, quinone, quinolone ester, phenol or alcohol functional groups of hydrocarbon-based compounds.

5. The method as described in any preceding clause, wherein at least 20% of oxygen in said oxygen comprising feedstock is in the form of carbonyl, carboxylic, ketone, anhydride, aldehyde, quinone, quinolone ester, phenol or alcohol functional groups of hydrocarbon-based compounds.

6. The method as described in in any preceding clause, wherein at least 30% of oxygen in said oxygen comprising feedstock is in the form of carbonyl, carboxylic, ketone, anhydride, aldehyde, quinone, quinolone, ester, phenol or alcohol functional groups of hydrocarbon-based compounds.

7. The method as described in in any preceding clause, wherein at least 10% of oxygen in said oxygen comprising feedstock is in the form of carbonyl, carboxylic, ketone, anhydride, aldehyde, quinone, quinolone, or ester functional groups of hydrocarbon-based compounds.

8. The method as described in in any preceding clause, wherein at least 20% of oxygen in said oxygen comprising feedstock is in the form of carbonyl, carboxylic, ketone, anhydride, aldehyde, quinone, quinolone, or ester functional groups of hydrocarbon-based compounds.

9. The method as described in any preceding clause, wherein at least 30% of oxygen in said oxygen comprising feedstock is in the form of carbonyl, carboxylic, ketone, anhydride, aldehyde, quinone, quinolone, or ester functional groups of hydrocarbon-based compounds.

10. The method as described in any preceding clause, wherein at least 40% of oxygen in said oxygen comprising feedstock is in the form of carbonyl, carboxylic, ketone, anhydride, aldehyde, quinone, quinolone, or ester functional groups of hydrocarbon-based compounds.

11. The method as described in any preceding clause, wherein at 0.25-40% of oxygen in said oxygen comprising feedstock is in the form of carbonyl, carboxylic, ketone, anhydride, aldehyde, quinone, quinolone, ester, phenol or alcohol functional groups of hydrocarbon-based compounds.

12. The method as described in any preceding clause, wherein at 0.25-15% of oxygen in said oxygen comprising feedstock is in the form of carbonyl, carboxylic, ketone, anhydride, aldehyde, quinone, quinolone, ester, phenol or alcohol functional groups of hydrocarbon-based compounds.

13. The method as described in clause 3, wherein said solid phase cannot be dissolved in solvents at ambient temperature and pressure.

14. The method as described in clause 3, wherein said solid phase is cross-linked and is not soluble in solvent or meltable under any conditions but can only be decomposed by acids or pyrolysis.

15. The method as described in any preceding clause, wherein said step of contacting said oxygen comprising feedstock comprises the step of contacting said oxygen comprising feedstock in the presence of one or more solvents or solvent mixture, and chemically reacting the oxygen comprising feedstock in the presence of said one or more solvents or solvent mixture.

16. The method as described in clause 15, wherein said one or more solvents or solvent mixture comprises a solvent selected from the group consisting of an aliphatic solvent, an aromatic solvent, a polar solvent, a basic solvent, and a hydrogen donating solvent.

17. The method as described in any preceding clause, wherein said primary amine is $H_2NR$, where R is alkyl, cyclic or aromatic, and can include unsaturated bonds and/or other functional groups.

18. The method as described in any preceding clause, wherein said secondary amine is HNR'R", where R' and R" are alkyl, cyclic or aromatic and can include unsaturated bonds and other functional groups, and wherein R' and R" are either the same or different.

19. The method as described in any preceding clause, wherein said amines are in a form selected from the group consisting of gas, liquid, solid, dissolved-in-solution, dissolved-in-gas, and any combination thereof.

20. The method as described in any preceding clause, wherein said one or more amine/amide comprises an amine/amide selected from the group consisting of: primary amine, primary amine with no preference given to isomers, methylamine, ethylamine, propylamine, butylamine, pentylamine (aminopentane), amine with branched alkyl chains, amine with branched cyclic alkyl chains, amine with aromatic groups, amine with branched aromatic groups, arylamine, cyclicamine, mono-amine, di-amine, tri-amine, higher polyamine bridged by alky, aryl, or cyclic hydrocarbons, saturated fatty amine with C6-C60 alkyl chains, unsaturated fatty amine, amine containing at least one unsaturated alky group, fatty amine from cocoamine, tallow amine or hydrogenated tallow amine, decylamine, secondary amine, tertiary amine, amide, derivative of amide, amine with a bridging alky, cyclic, or aromatic unit connected to another functional group such as unsaturated carbons or functional groups of oxygen, nitrogen, sulfur, phosphorous, or silicon, or any combination thereof.

21. The method as described in any preceding clause, wherein said amines comprise one or more recycle streams derived from an oxygen comprising feedstock amine/amide reaction process or any combination thereof.

22. The method as described in any preceding clause, wherein said step of contacting said oxygen comprising feedstock comprises the step of contacting said oxygen comprising feedstock with said at least one amine/amide according to a ratio of volume of amine/amide to volume of oxygen comprising feedstock selected within the range of about 0.1:1 to about 50:1.
23. The method as described in any preceding clause, wherein said step of contacting said oxygen comprising feedstock comprises the step of contacting said oxygen comprising feedstock with said at least one amine/amide for a duration from about 1 minute to about 24 hours.
24. The method as described in any preceding clause, wherein said step of contacting said oxygen comprising feedstock is carried out at a pressure within the range of about 0.1 atmosphere to about 200 atmospheres.
25. The method as described in any preceding clause, wherein said step of contacting said oxygen comprising feedstock is carried out at a temperature within the range of about 60° C. atmosphere to about 400° C.
26. The method as described in any preceding clause, wherein said step of contacting said oxygen comprising feedstock is carried out at a temperature within the range of about 100° C. to about 360° C.
27. The method as described in any preceding clause, wherein said step of contacting said oxygen comprising feedstock is carried out at a temperature within the range of about 100° C. to about 250° C.
28. The method as described in any preceding clause, wherein said step of contacting said oxygen comprising feedstock is carried out at super critical fluid conditions.
29. The method as described in any preceding clause other than clause 3, wherein said step of generating comprises the step of converting at least about 15 wt % of said oxygen comprising feedstock to said amine/amide reacted liquid phase.
30. The method as described in any preceding clause other than clause 3, wherein said step of generating comprises the step of converting about 15 to about 90 wt % of said oxygen comprising feedstock to said amine/amide reacted liquid phase.
31. The method as described in any preceding clause other than clause 3, wherein said step of generating comprises the step of converting about 30 to about 90 wt % of said oxygen comprising feedstock to said amine/amide reacted liquid phase.
32. The method as described in any preceding clause other than clauses 1 and 2, wherein said step of generating comprises the step of converting at least about 15 wt % of said oxygen comprising feedstock to said amine/amide reacted solid phase.
33. The method as described in any preceding clause other than clauses 1 and 2, wherein said step of generating comprises the step of converting about 15 to about 90 wt % of said oxygen comprising feedstock to said amine/amide reacted solid phase.
34. The method as described in any preceding clause other than clauses 1 and 2, wherein said step of generating comprises the step of converting about 30 to about 90 wt % of said oxygen comprising feedstock to said amine/amide reacted solid phase.
35. The method as described in any preceding clause, wherein said step of contacting said oxygen comprising feedstock comprises a step selected from the group consisting of blending said feedstock with said one or more amine, admixing said one or more amine/amide with said feedstock; spraying said one or more amine/amide (amine and/or amide) on said feedstock, diffusively admixing said one or more amine or amide with said feedstock, and gravitationally admixing said one or more amine or amide with said feedstock.
36. The method as described in any preceding clause, wherein said step of contacting said oxygen comprising feedstock with said one or more amine or amide comprises the step of contacting a solid or a liquid with said one or more amine or amide.
37. The method as described in any preceding clause, wherein said oxygen comprising feedstock comprises a feedstock that is at least partially derived from a substance selected from the group consisting of oxygen rich biomass, peat, activated carbon, lignin, tannic acid, terpenoids, cellulose, sugars, carbohydrates, proteins, fatty acids, naphthenic acids, municipal waste, food wastes, graphene oxide, oxidized plastics, oxygen comprising plastics like polyethylene terephthalate, oxidized composite materials, oxygen comprising composite material, kerogen, oxidized kerogen, combusted material, partially combusted material, chars, petroleum, asphaltenes, interfacial asphaltenes, oxidized asphalts, oxidized asphaltene, asphaltenes produced from oxidation of hydrocarbon sources, emulsion asphaltenes, natural surfactants, oxidized asphalt, oxidized shingle asphalt, autooxidation products from petroleum, autooxidation products from natural gas, autooxidation products from biomass, autooxidation products from chemical refining, epoxy, epoxy form wind turbine blades, hydroxylated or carboxylated polymers, functionalized polymers including polyethylene terephthalate, polyacetates and acrylates of ethylene, or a derivative thereof.
38. The method as described in any clause other than clauses 1 and 2, wherein the solid phase comprises a polymeric solid phase.
39. The method as described in any preceding clause other than clause 3 wherein amine/amide reacted liquid phase is soluble in a solvent with a Hansen solubility parameter equal or less than about 18.2 $MPa^{0.5}$.
40. The method as described in in any preceding clause other than clause 3, wherein said amine/amide reacted liquid phase is soluble in a solvent with a Hansen solubility parameter equal or less than about 16.8 $MPa^{0.5}$.
41. The method as described in any preceding clause other than clause 3, wherein said amine/amide reacted liquid phase is soluble in a solvent with a Hansen solubility parameter equal or less than about 15.3 $MPa^{0.5}$.
42. The method as described in any preceding clause other than clauses 1 and 2, wherein amine/amide reacted solid phase is at least 50% insoluble in a solvent with a Hansen solubility parameter equal or less than about 18.2 $MPa^{0.5}$.
43. The method as described in any preceding clause other than clauses 1 and 2, wherein said amine/amide reacted solid phase is at least 50% insoluble in a solvent with a Hansen solubility parameter equal or less than about 20.2 $MPa^{0.5}$.
44. The method as described in any preceding clause, wherein said step of contacting comprises the steps of:
exposing said oxygen comprising feedstock to said amine/amide;
decomposing at least some of said amine/amide; and
converting at least 25 wt % of the oxygen comprising feedstock to amine/amide reacted liquid phase.

45. The method as described in clause 44, wherein said amine/amide comprises cocoamine.
46. The method as described in any one of the preceding clauses, wherein said step of contacting the oxygen comprising feedstock is carried out at a temperature selected from the range of about 250° C. to about 400° C.
47. The method as described in any one of the preceding clauses, wherein said step of contacting the oxygen comprising feedstock is carried out as a process selected from the group consisting of batch process, a Dean Stark apparatus based process, a flow through process, and any combination thereof.
48. The method as described in any one of the preceding clauses wherein said method is an asphalt rejuvenator manufacturing method, an asphalt antistrip additive manufacturing method, an asphalt warm mix additive manufacturing method, a compaction improvement method, a softening improvement method, a stripping improvement method, an adhesion improvement method, a cohesion improvement method, a stripping improvement method, an embrittlement improvement method, a cracking improvement method, a durability improvement method, a recyclability improvement method, an m-value improvement method, a paving application emissions reduction method, an asphalt physical properties enhancer (e.g., PG modifiers) manufacturing method, a ΔTc improvement method, an upper PG lowering method, a lower PG lowering method, a m-value lowering method, a S lowering method, a Glover-Rowe improvement method, a cross over temperature improvement method, a rheological value improvement method, a phase angle improvement method, a penetration increase method, a decrease ring and ball softening point method, decrease softening point method, a method to change melting point properties, a method to change crystallization properties, a method to improve flow properties, a method to improve lubricity, lubricatins method, surfactant, method, decrease viscosity method, a method to compatibilize indigenous asphaltenes, a method to compatibilize added asphaltenes, a surfactant manufacturing method, an emulsifier manufacturing method, a water repelling coatings manufacturing method, a water resistant coatings manufacturing method, an underwater sealant manufacturing method, a polymer manufacturing method, a polymer cross-linker method, synthetic rubber, rubber cross-linking method, polymeric coatings, coatings, a polyurethane additive manufacturing method, an activators for cyanoacrylates coatings manufacturing method, a hydrogen-bonding gel manufacturing method, a corrosion inhibitor manufacturing method, a fuel additive, foulant additives method, decarbomizing additives method, an antimicrobial (ammonium salts) coating manufacturing method, a method for producing dye sensitizers for solar cell applications, an antistatic and soil-release finish manufacturing method, an iron-ore beneficiation method, a froth flotation surfactant manufacturing method, an asphaltene dispersant manufacturing method, a wax inhibitor manufacturing method, a drilling and fracking mud method, a method to enhance oil recovery additive, a method for manufacturing additive for plastics and composites, a resin for epoxy manufacturing method, a resin for 3-D printing manufacturing method, a resin for inkjet printing manufacturing method, a thermoset resin method, a thermally activated resin method, a photo activated resin method, a method to change solubility, a method to change hydrophilicity, a method to change hydrophobicity, a method to change lyophilicity, a method to change oleophilicity, a method to change hydroscopic properties, a method to change surface tension properties, a method to change wettability, and a method to change surface properties.

As can be easily understood from the foregoing, the basic concepts of the present invention may be embodied in a variety of ways. It involves both material modulation techniques (e.g., by contacting the amine with an oxygen containing hydrocarbon with temperature to facilitate reactions to reduce the oxygen content and change the solubility, polarity, melt properties and/or functionality of the products), as well as devices to accomplish the appropriate modulation. In this application, the modulation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 80% of the specified value or relative condition; correspondingly for values at the other end of the spectrum (e.g., substantially free of x, these should be understood as encompassing the options of percentage values that include not more than 0.5%, 1%, 3%, 5%, 8%, 10%, 15% or even 20% of the specified value or relative condition, all whether by volume or by weight as either may be specified. For example, using percentage values as one example, for a product to be substantially only the desired product, it should be understood that embodiments of the invention may encompass the option of percentage values that include 99.5%, 99%, 97%, 95%, 92% or even 90% of the output being the desired product. Correspondingly for values at the other end of the spectrum (e.g., substantially free of a substance, embodiments of the invention should be understood as encompassing the options of percentage values that include not more than 0.5%, 1%, 3%, 5%, 8% or even 10% of the substance, whether by volume or by weight.} In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Any specific indication in this application of a certain percentage (e.g., a wt % of one material in another) should be understood to also include disclosure of a range centered on that certain percentage (%), bounded by inclusive endpoints that are equal to that certain % plus and minus 2 percentage points, 5 percentage points, 7 percentage points, 10 percentage points, and 15 percentage points (so a specifically disclosed percentage of 20% should be understood as including disclosure of a range of, e.g., 18-22% (inclusive), 15-25% (inclusive), etc.) Similar implied disclosure is intended to take place with respect to other specific parameter values (i.e., accompanying such explicit disclosure is an implicit disclosure of a range centered on that explicit value that is bounded by inclusive endpoints that are equal to that certain value plus and minus 2 percentage points (of that value), 5 percentage points, 7 percentage points, 10 percentage points, and 15 percentage points. So an explicitly disclosed temperature of 20° C. includes disclosure of a temperature that is at least 18° C. up to and including 2° C. (i.e., plus and minus 10%). Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "process" should be understood to encompass disclosure of the act of "processing"—whether explicitly discussed or not—and, conversely, were there effectively disclosure of the act of "processing", such a disclosure should be understood to encompass disclosure of a "process" and even a "means for processing" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the method-related devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of processing a feedstock comprising the steps of:
   providing a hydrocarbon feedstock which contains oxygen, wherein said hydrocarbon feedstock comprises a first solubility;
   contacting said hydrocarbon feedstock with one or more primary or secondary mono-amine or amide, under non-pyrolytic conditions;
   liquifying said hydrocarbon feedstock with said one or more primary or secondary mono-amine or amide;
      wherein said step of liquifying said hydrocarbon feedstock with said one or more primary or secondary mono-amine or amide comprises breaking chemical bonds in said hydrocarbon feedstock;
   and
   generating a reacted liquid phase as a result of said step of liquifying said hydrocarbon feedstock with said one or more primary or secondary mono-amine or amide,
      wherein said reacted liquid phase comprises 0.25 to 25 wt % nitrogen,
      wherein said reacted liquid phase has at most 85% of said oxygen than originally found in said hydrocarbon feedstock,
      wherein of said reacted liquid phase comprises a second solubility which is greater than said first solubility of said coal derived hydrocarbon feedstock;
      wherein said reacted liquid phase is dissolvable in a solvent having a Hansen solubility parameter less than 27 $MPa^{0.5}$; and
      wherein said reacted liquid phase has a softening point of less than 400° C.

2. The method as described in claim 1, wherein at least 10% of said oxygen in said hydrocarbon feedstock comprises a form selected from carbonyl, carboxylic, ketone, anhydride, aldehyde, quinone, quinolone ester, and phenol or alcohol functional groups of hydrocarbon-based compounds.

3. The method as described in claim 1, wherein said step of contacting said hydrocarbon feedstock with said one or more primary or secondary mono-amine or amide comprises the step of contacting said hydrocarbon feedstock with said one or more primary or secondary mono-amine or amide in the presence of one or more solvents or solvent mixture.

4. The method as described in claim 3, wherein said one or more solvents or solvent mixture comprises a solvent chosen from an aliphatic solvent, an aromatic solvent, a polar solvent, a basic solvent, and a hydrogen donating solvent.

5. The method as described in claim 1, wherein said primary amine comprises a formula of $H_2NR$, wherein R comprises an alkyl, cyclic or aromatic, and can include unsaturated bonds and/or other functional groups.

6. The method as described in claim 1, wherein said secondary amine comprises a formula of $HNR'R''$, wherein R' and R'' comprises an alkyl, cyclic or aromatic and can include unsaturated bonds and other functional groups, and wherein R' and R'' are either the same or different.

7. The method as described in claim 1, wherein one or more primary or secondary mono-amine or amide is chosen from a primary amine; a primary amine with no preference given to isomers; methylamine; ethylamine; propylamine; butylamine; pentylamine (aminopentane); an amine with branched alkyl chains; an amine with branched cyclic alkyl chains; an amine with aromatic groups; an amine with branched aromatic groups; arylamine; cyclicamine; mono-amine, di-amine; tri-amine; higher polyamine bridged by alky, aryl, or cyclic hydrocarbons; saturated fatty amine with C6-C60 alkyl chains; unsaturated fatty amine; amine containing at least one unsaturated alky group; fatty amine from cocoamine, tallow amine or hydrogenated tallow amine; decylamine; secondary amine; amide; derivative of amide; amine with a bridging alky, cyclic, or aromatic unit connected to another functional group chosen from unsaturated carbons, oxygen, nitrogen, sulfur, or silicon; or any combination thereof.

8. The method as described in claim 1, wherein said reacted liquid phase comprises one or more recycle streams derived from said step of liquifying said hydrocarbon feedstock with said one or more primary or secondary mono-amine or amide.

9. The method as described in claim 1, wherein said step of contacting said hydrocarbon feedstock with said one or more primary or secondary mono-amine or amide comprises the step of contacting said hydrocarbon feedstock with said one or more primary or secondary mono-amine or amide according to a ratio of volume of said one or more primary or secondary mono-amine or amide to volume of hydrocarbon feedstock selected within the range of about 0.1:1 to about 50:1.

10. The method as described in claim 1, wherein said step of contacting said oxygen comprising feedstock is carried out at a pressure within the range of about 0.1 atmosphere to about 200 atmospheres.

11. The method as described in claim 1, wherein said step of contacting said hydrocarbon feedstock with one or more primary or secondary mono-amine or amide is carried out at a temperature between about 120° ° C. to about 400° C.

12. The method as described in claim 1, wherein said step of contacting said hydrocarbon feedstock with said one or more primary or secondary mono-amine or amide is carried out with said one or more primary or secondary mono-amine or amide at super critical fluid conditions.

13. The method as described in claim 1, wherein said step of contacting said hydrocarbon feedstock with said one or more primary or secondary mono-amine or amide comprises a step chosen from
blending said hydrocarbon feedstock with said one or more with said one or more primary or secondary mono-amine or amide;
admixing said one or more primary or secondary mono-amine or amide with said hydrocarbon feedstock;
spraying said one or more primary or secondary mono-amine or amide on said hydrocarbon feedstock;
diffusively admixing said one or more primary or secondary mono-amine or amide with said hydrocarbon feedstock; and
gravitationally admixing said one or more primary or secondary mono-amine or amide with said hydrocarbon feedstock.

14. The method as described in claim 1, wherein hydrocarbon feedstock is at least partially derived from a substance chosen from oxygen rich biomass, peat, activated carbon, lignin, tannic acid, terpenoids, cellulose, sugars, carbohydrates, proteins, fatty acids, naphthenic acids, municipal waste, food wastes, graphene oxide, oxidized plastics, oxygen comprising plastics like polyethylene terephthalate, oxidized composite materials, oxygen comprising composite material, kerogen, oxidized kerogen, combusted material, partially combusted material, chars, petroleum, asphaltenes, interfacial asphaltenes, oxidized asphalts, oxidized asphaltene, asphaltenes produced from oxidation of hydrocarbon sources, emulsion asphaltenes, natural surfactants, oxidized asphalt, oxidized shingle asphalt, autooxidation products from petroleum, autooxidation products from natural gas, autooxidation products from biomass, autooxidation products from chemical refining, epoxy, epoxy form wind turbine blades, hydroxylated or carboxylated polymers, functionalized polymers, polyethylene terephthalate, polyacetates, acrylates of ethylene, and a derivative thereof.

15. The method as described in claim 1, wherein said step of contacting said hydrocarbon feedstock with said one or more primary or secondary mono-amine or amide comprises the steps of:
exposing said hydrocarbon feedstock to said one or more primary or secondary mono-amine or amide;
decomposing at least some of said one or more primary or secondary mono-amine or amide; and
converting at least 25 wt % of the hydrocarbon feedstock to said reacted liquid phase.

16. The method as described in claim 1, wherein said step of contacting said hydrocarbon feedstock with one or more primary or secondary mono-amine or amide is carried out as a process chosen from batch process, a Dean Stark apparatus based process, a flow through process, and any combination thereof.

17. The method as described in claim 1, wherein said method is an asphalt rejuvenator manufacturing method, an asphalt antistrip additive manufacturing method, an asphalt warm mix additive manufacturing method, a compaction improvement method, a softening improvement method, a stripping improvement method, an adhesion improvement method, a cohesion improvement method, a stripping improvement method, an embrittlement improvement method, a cracking improvement method, a durability improvement method, a recyclability improvement method, an m-value improvement method, a paving application emissions reduction method, an asphalt physical properties enhancer manufacturing method, a ΔTc improvement method, an upper PG lowering method, a lower PG lowering method, a m-value lowering method, a S lowering method, a Glover-Rowe improvement method, a cross over temperature improvement method, a rheological value improvement method, a phase angle improvement method, a penetration increase method, a decrease ring and ball softening point method, decrease softening point method, a method to change melting point properties, a method to change crystallization properties, a method to improve flow properties, a method to improve lubricity, lubrications method, surfactant, method, decrease viscosity method, a method to compatibilize indigenous asphaltenes, a method to compatibilize added asphaltenes, a surfactant manufacturing method, an emulsifier manufacturing method, a water repelling coatings manufacturing method, a water resistant coatings manufacturing method, an underwater sealant manufacturing method, a polymer manufacturing method, a polymer cross-linker method, synthetic rubber, rubber cross-linking method, polymeric coatings, coatings, a polyurethane additive manufacturing method, an activators for cyanoacrylates coatings manufacturing method, a hydrogen-bonding gel manufacturing method, a corrosion inhibitor manufacturing method, a fuel additive, foulant additives method, decarbonizing additives method, an antimicrobial (ammonium salts) coating manufacturing method, a method for producing dye sensitizers for solar cell applications, an antistatic and soil-release finish manufacturing method, an iron-ore beneficiation method, a froth flotation surfactant manufacturing method, an asphaltene dispersant manufacturing method, a wax inhibitor manufacturing method, a drilling and fracking mud method, a method to enhance oil recovery additive, a method for manufacturing additive for plastics and composites, a resin for epoxy manufacturing method, a resin for 3-D printing manufacturing method, a resin for inkjet printing manufacturing method, a thermoset resin method, a thermally activated resin method, a photo activated resin method, a method to change solubility, a method to change hydrophilicity, a method to change hydrophobicity, a method to change lyophilicity, a method to change oleophilicity, a method to change hydroscopic properties, a method to change surface tension properties, a method to change wettability, and a method to change surface properties.

\* \* \* \* \*